US011606816B2

United States Patent
Holcombe et al.

(10) Patent No.: US 11,606,816 B2
(45) Date of Patent: Mar. 14, 2023

(54) METHOD, NODE, AND SYSTEM FOR REDUCING COLLISIONS IN A TIME-SYNCHRONIZED CHANNEL HOPPING NETWORK

(71) Applicant: Landis+Gyr Innovations, Inc., Alpharetta, GA (US)

(72) Inventors: Michael Sean Holcombe, Roswell, GA (US); Justin Clifford Matthews, Arncliffe (AU)

(73) Assignee: Landis+Gyr Innovations, Inc., Alpharetta, GA (US)

(*) Notice: Subject to any disclaimer, the term of this patent is extended or adjusted under 35 U.S.C. 154(b) by 239 days.

(21) Appl. No.: 16/940,629

(22) Filed: Jul. 28, 2020

(65) Prior Publication Data

US 2022/0039154 A1 Feb. 3, 2022

(51) Int. Cl.
*H04L 12/413* (2006.01)
*H04W 74/08* (2009.01)
*H04W 72/0446* (2023.01)
*H04W 72/10* (2009.01)
*H04W 84/18* (2009.01)

(52) U.S. Cl.
CPC ....... *H04W 74/0808* (2013.01); *H04L 12/413* (2013.01); *H04W 72/0446* (2013.01); *H04W 72/10* (2013.01); *H04W 84/18* (2013.01)

(58) Field of Classification Search
CPC ........... H04J 2203/0091; H04W 74/08; H04W 74/0808; H04W 74/0816; H04W 74/0825; H04W 28/044; H04L 12/413
See application file for complete search history.

(56) References Cited

U.S. PATENT DOCUMENTS

| | | | |
|---|---|---|---|
| 2016/0360546 A1* | 12/2016 | Kandhalu Raghu | ......................... H04W 74/0808 |
| 2018/0020447 A1* | 1/2018 | Thubert | ............ H04W 74/0825 |
| 2018/0035442 A1* | 2/2018 | Jin | ......................... H04L 5/0064 |
| 2018/0167955 A1* | 6/2018 | Prakash | ................ H04W 40/02 |

OTHER PUBLICATIONS

Vilajosana et al., "RFC8180: Minimal IPv6 over the TSCH Mode of IEEE 802.15.4e (6TiSCH) Configuration", May 2017, pp. 1-28 (Year: 2017).*

* cited by examiner

*Primary Examiner* — Salvador E Rivas
(74) *Attorney, Agent, or Firm* — Kilpatrick Townsend & Stockton LLP

(57) ABSTRACT

A method for avoiding collision between a parent node and a child node in a time-slotted-channel-hopping (TSCH) mesh network is provided. For example, each node in the TSCH network can be configured to obtain a transmit offset index. At the beginning of a timeslot, the node determines its transmission priority based on the transmit offset index and an absolute slot number (ASN) of the timeslot. If the transmission priority of the node is an early transmission priority, the node transmits data packets according to the normal transmission process of the TSCH network. If the transmission priority of the node is a late transmission priority, the node enters a listen before talk (LBT) mode to listen for incoming communication on the network. If no incoming communications are detected during the LBT mode, the node then transmits data packets according to the normal transmission process of the TSCH network.

20 Claims, 6 Drawing Sheets

SCENARIO 1

SCENARIO 2

SCENARIO 3

METHOD, NODE, AND SYSTEM FOR REDUCING COLLISIONS IN A TIME-SYNCHRONIZED CHANNEL HOPPING NETWORK

TECHNICAL FIELD

This disclosure relates generally to communications between nodes in a mesh network. More particularly, this disclosure relates to avoiding communication collisions in a time-slotted channel hopping (TSCH) network.

BACKGROUND

In a network, infrastructure nodes (or simply "nodes"), such as meters, gateways, or routers, constantly communicate with each other to, for example, exchange messages or transmit data. When multiple nodes attempt to transmit data on the network at the same time, a network collision may occur. In a time-synchronized channel hopping (TSCH) network, various nodes are synchronized and transmissions by different nodes begin at the specified offset into a time slot. As such, network collisions may occur among the nodes in the TSCH network.

Some types of collisions may occur more often depending on the communications on the network. For example, in routed networks, most of the unicast communications occur between a parent node and a child node. When the amount of two-way communication is high, such as with TCP communications, the probability of network collisions between a parent node and a child node is increased. In these types of networks, avoiding the collisions between a parent node and a child node can significantly reduce the occurrence of network collisions thereby improving the efficiency of the network communications.

SUMMARY

Aspects and examples are disclosed for apparatuses and processes for avoiding network collisions in mesh network communications. For instance, a method for reducing collision in a time-slotted channel hopping (TSCH) network includes obtaining, by a node in the TSCH network, a transmit offset index; determining, by the node at a beginning of a timeslot of the TSCH network, a transmission priority of the node for the timeslot based on the transmit offset index and an absolute slot number (ASN) of the timeslot; and in response to determining that the transmission priority of the node is an early transmission priority, transmitting data, by the node, in a transmission mode via the TSCH network. The method further includes in response to determining that the transmission priority of the node is a late transmission priority, listening for, by the node, incoming communications on the TSCH network in a listen before talk (LBT) mode; and in response to detecting no incoming communications during the LBT mode, transmitting data, by the node after the LBT mode is over, in the transmission mode via the TSCH network.

In another example, a node of a time-slotted channel hopping (TSCH) network includes a processor configured to execute computer-readable instructions, and a memory configured to store the computer-readable instructions that, when executed by the processor, cause the processor to perform operations. The operations include determining, at a beginning of a timeslot of the TSCH network, a transmission priority of the node for the timeslot based on a transmit offset index assigned to the node and an absolute slot number (ASN) of the timeslot; and in response to determining that the transmission priority of the node is an early transmission priority, transmitting data in a transmission mode via the TSCH network. The operations further include in response to determining that the transmission priority of the node is a late transmission priority, listening for incoming communications on the TSCH network in a listen before talk (LBT) mode; and in response to detecting no incoming communications during the LBT mode, transmitting, after the LBT mode is over, data in the transmission mode via the TSCH network.

In an additional example, a system includes a plurality of nodes connected through a time-slotted channel hopping (TSCH) network. A first node of the plurality of nodes is configured for performing operations including determining, at a beginning of a timeslot of the TSCH network, a transmission priority of the first node for the timeslot based on a transmit offset index assigned to the first node and an absolute slot number (ASN) of the timeslot, and in response to determining that the transmission priority of the first node is an early transmission priority, transmitting data in a transmission mode via the TSCH network to a second node of the plurality of nodes. The operations further include in response to determining that the transmission priority of the node is a late transmission priority, listening for incoming communications from the second node on the TSCH network in a listen before talk (LBT) mode; and in response to detecting no incoming communications from the second node during the LBT mode, transmitting data in the transmission mode to the second node via the TSCH network after the LBT mode is over.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are provided for avoiding network communication collisions between a parent node and a child node in a time-synchronized channel hopping (TSCH) network. Each node in the TSCH network can be assigned a transmit offset index, for example, based on the layer of the network where the node resides. Because a parent node and a child node reside on different layers of the network, the parent node and child node will be assigned with different transmit offset indexes. Note that since the network layers may be dynamic and change over time, the transmit offset index of a node may also change as its layer changes. At the beginning of a timeslot, the parent node and the child node can each compare their respective transmit offset indexes with the absolute slot number (ASN) of the current timeslot to determine their respective transmission priorities. Because the parent node and the child node have different transmit offset indexes, their transmission priorities are also different.

For the node that has the early transmission priority, if the node has data to transmit, the node can enter a normal transmission mode to transmit the data packets. For example, in the normal transmission mode, the node can perform a clear channel assessment (CCA) during a transmission offset and start transmitting the data packets if no ongoing communications are detected during the transmission offset. If the node does not have data to transmit, the node can enter a receiving mode to receive incoming communications over the TSCH network.

For the node that has the late transmission priority, if the node has no data to transmit, the node can enter the receiving mode to receive incoming communications. If the node has data to transmit, the node starts a listen before talk (LBT) window to listen for incoming communications from nodes that have an early transmission priority. If the node receives an incoming frame during the LBT window, the node will continue to receive the rest of the incoming communication as normal. The node can attempt to transmit its data in the next available timeslot. If the node does not receive an incoming frame during the LBT window, the node will enter the normal transmission mode to transmit its data packets.

Techniques described in the present disclosure reduces the network collision in TSCH network communications by at least avoiding collisions between a parent node and a child node. By assigning different transmit offset indexes to the parent node and the child node, different transmission priorities can be determined for the parent node and the child node on a per timeslot basis. The node with a late transmission priority is configured to introduce additional offset (e.g., the LBT window) before transmitting its data packets, thereby avoiding transmitting data at the same time by both the parent node and the child node. As a result, communications in the network become more efficient and more reliable.

Figure 1:
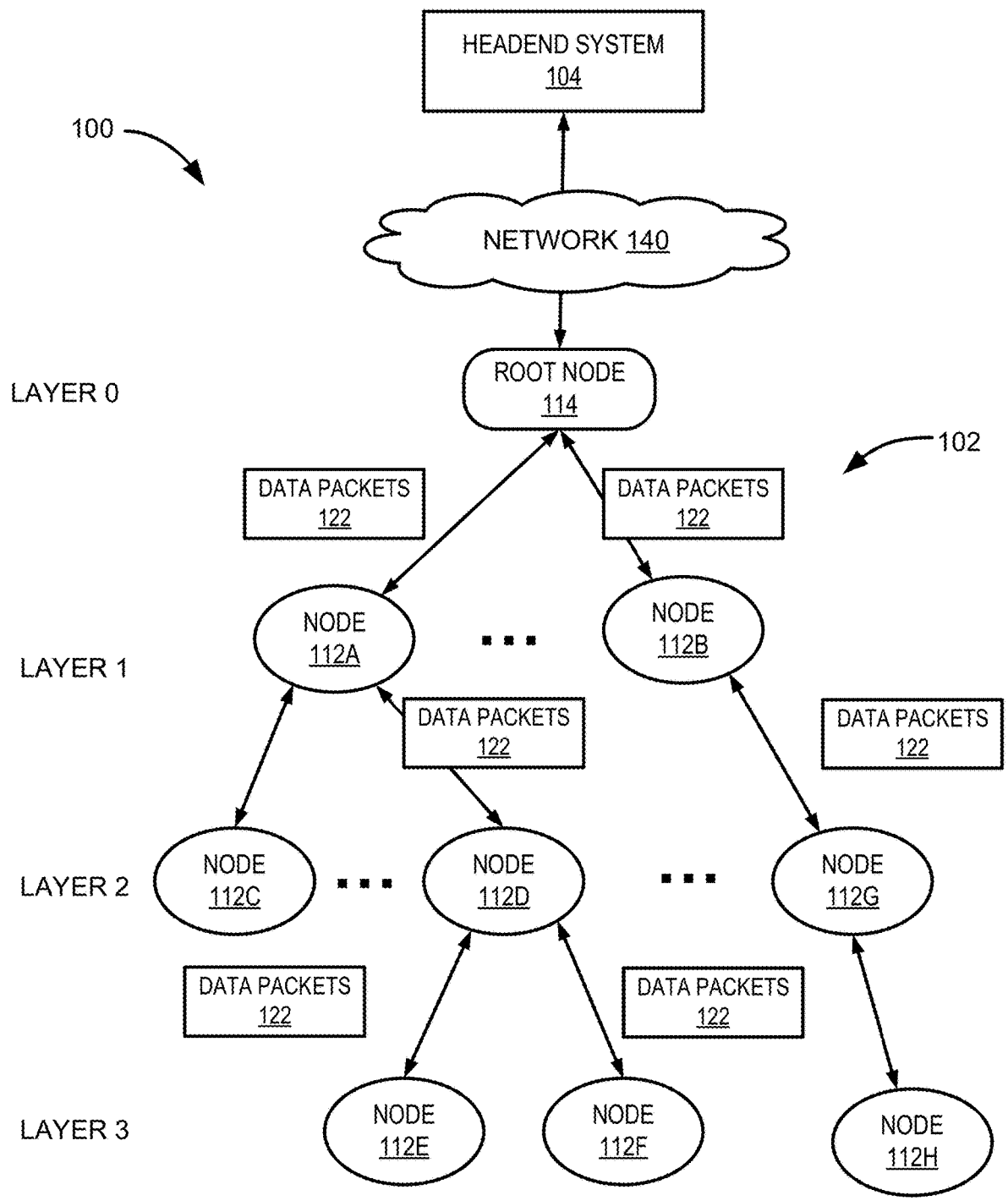
FIG. 1 is a block diagram showing an illustrative operating environment for avoiding network collisions in mesh network communications, according to certain examples of the disclosure.

FIG. 1 shows an illustrative operating environment 100 for avoiding network collisions in mesh network communications. The operating environment 100 includes a mesh network 102 in which nodes are configured to avoid network collisions between parent nodes and child nodes. The network 102 shown in FIG. 1 includes multiple nodes 112A-112H (which may be referred to herein individually as a node 112 or collectively as the nodes 112). The nodes 112 may include measuring nodes for collecting data from the respective deployed location of the nodes, processing nodes for processing data available to the nodes, router nodes for forwarding data received from one node to another node in the network 102, or nodes that are configured to perform a combination of these functions. The nodes 112 are further configured to communicate with each other so that data packets 122 containing messages or other data can be exchanged between the nodes 112.

In one example, the mesh network 102 can be associated with a resource distribution network, such as a utility network, to deliver measurement data obtained in the resource distribution network. In this example, the nodes 112 can include meters such as electricity meters, gas meters, water meters, steam meters, etc. and be implemented to measure various operating characteristics of the resource distribution network and to transmit the collected data through the mesh network 102 to, for example, a root node 114.

A root node 114 of the network 102 may be configured for communicating with the nodes 112 to perform operations such as managing the nodes 112, collecting data from the nodes 112, and forwarding data to a headend system 104. A root node 114 can also be configured to function as a node to measure and process data itself. The root node 114 may be a personal area network (PAN) coordinator, a gateway, or any other device capable of communicating with the headend system 104. The root node 114 ultimately transmits the generated and collected data to the headend system 104 via another network 140, such as the Internet, an intranet, or any other data communication network. The headend system 104 can function as a central processing system that receives streams of data or messages from the root node 114. The headend system 104 can process the collected data or have the collected data be processed for various applications.

The nodes 112 and 114 in the mesh network 102 can be organized in layers. The layer where the root node 114 resides is generally referred to as layer 0. Nodes 112 that join the network through the root node 114, such as nodes 112A and 112B, form the layer one of the network 102. Likewise, the nodes 112 that join the network 102 through a layer-one node form layer two of the network 102, such as nodes 112C-112D, and 112G. Layer-three nodes of the mesh network 102 can include nodes that join the network 102 through a layer-two node. Additional layers can be identified in a similar way.

Furthermore, a root node 114 is generally referred to as a parent node due to data links with the nodes, such as nodes 112A-112B, that are located at a node layer below the root node 114 (i.e., layer one). For example, the root node 114 is a parent node of the nodes 112A-112B. To the root node 114, each of the nodes 112A-112B is a child node. As illustrated in FIG. 1, nodes 112A-112B may also be referred to as parent nodes due to data links with nodes 112C-112D, and 112G that are located at a node layer below the nodes 112A-112B (i.e., layer two). For example, node 112A is a parent node and node 112C is a child node. Similarly, nodes 112C-112D, and 112G may also be referred to as parent nodes due to data links with nodes 112E-112F and 112H that are located at a node layer below the nodes 112C-112D, and 112G (i.e., layer three). It should be noted that the network layers may be dynamic and change over time (e.g., nodes 112 may change its parent node from time to time due to network condition changes). The nodes 112A-112H may all funnel data up through the node layers to the root node 114 and ultimately to the headend system 104. The root node 114 may transmit data, such as management data issued by the root node or received from the headend system 104, to the nodes 112 at various layers through the data links between the parent nodes and the child nodes.

In some examples, the nodes 112 in the mesh network 102 may be configured to communicate with each other using a TSCH protocol. In the TSCH protocol, nodes within the network 102 are synchronized on a TSCH timeslot. Each timeslot in the TSCH protocol has a time duration which can be defined in milliseconds or other appropriate time units. Under the TSCH protocol, when a node has data packets to be transmitted, the node is configured to start a transmission offset and perform a clear channel assessment (CCA) during the transmission offset to check the channel state before transmitting a packet. If no ongoing communication is detected during the CCA, the node will proceed with transmitting its data packets. If ongoing communication is detected during the CCA, the node will refrain from transmitting its data packets, such as by entering an idle state. The above process of performing CCA and then transmitting a packet if no ongoing communication is detected during the CCA is referred to herein as the normal transmission process and the node that is performing the normal transmission process is referred to as being in the normal transmission mode.

Performing CCA can avoid a collision with an ongoing transmission on the network. However, CCAs cannot prevent collisions among nodes that seek to initiate transmission on the same channel in the same timeslot because the nodes in the network are synchronized and no transmissions are ongoing when a CCA is being performed by the nodes in the network. As such, CCA is used to detect external interference and prevent data transmission when external interference is detected. To avoid the collision among nodes, especially between a parent node and a child node, each node in the mesh network 102 is configured to determine a transmission priority so that the transmission priority of a parent node is different from that of a child node. When the parent node and the child node transmit data according to their respective transmission priorities, the transmission will not occur at the same time, thereby avoiding communication collisions.

More specifically, each node in the mesh network 102 can be assigned a transmit offset index. For each timeslot, the transmit offset index can be combined with the absolute slot number (ASN) of the current timeslot to determine the transmission priority for each node. To obtain different transmission priorities for the parent node and the child node, the transmit offset index assigned to the parent node is different from that assigned to the child node. For example, the transmit offset index can be assigned by the parent node when a node joins the mesh network 102 or changes its parent node so that the child node has a different transmit offset index than the parent node.

In some implementations, the transmit offset index is a binary index having value 0 or 1. The root node 114 can be assigned a predetermined transmit offset index value and other nodes are each assigned, by its parent node, a transmit offset index opposite to that of its parent node. For instance, the root node 114 (at layer 0) is assigned a transmit offset index 0. When a layer-one node joins the network through the root node 114, such as the node 112A, this layer-one node is assigned a transmit offset index 1 which is opposite to the transmit offset index of its parent node. When a layer-two node joints the network through a layer-one node (e.g., node 112C joining the network through its parent node 112A), the layer-one node can assign a transmit offset index 0 to this layer-two node, which is opposite to the layer-one node (i.e., the parent node of the layer-two node). The transmit offset index of other nodes can be assigned in a similar way.

Based on the transmit offset index, each node can determine its transmission priority for each timeslot. In some examples, the transmission priority of a node is determined according to the parity of the ASN of the current timeslot.

For instance, in an even-numbered ASN, nodes with transmit offset index 0 would have an early transmission priority, and nodes with transmit offset index 1 would have a late transmission priority. In an odd-numbered ASN, nodes with transmit offset index 1 would have the early transmission priority, and nodes with transmit offset index 0 would have the late transmission priority. Nodes having the early transmission priority can transmit the data packet as normal, whereas nodes with the late transmission priority will be configured to add an additional transmission offset before transmitting data packets. In this way, the parent node and the child node do not transmit at the same time, thereby avoiding the collision. Additional details regarding avoiding collision between a parent node and a child node are described below with regard to FIGS. 2-5.

It should be appreciated that the mechanism described herein for avoiding collision can be utilized by any nodes in the network 102, including the node 112, the root node 114, or any other nodes of the network 102 that are capable of communicating with other nodes of the network. In addition, while FIG. 1 depicts a specific network topology (e.g., a DODAG tree), other network topologies are also possible (e.g, a ring topology, a mesh topology, a star topology, etc.).

Figure 2:
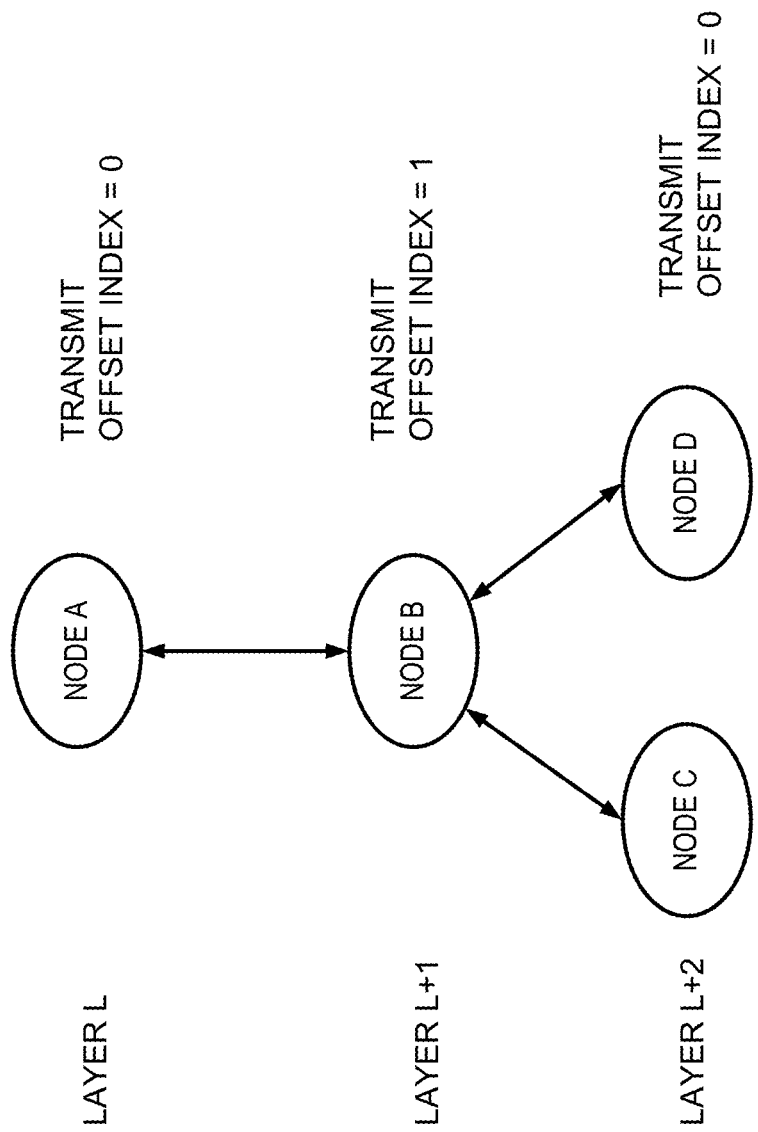
FIG. 2 is a diagram showing an example topology of a portion of the mesh network, according to certain examples of the disclosure.

Referring now to FIG. 2, FIG. 2 illustrates an example topology of a portion of the mesh network 102. In this topology, node A is at layer L and L is an integer greater than or equal to 0. Node A is the parent node of child node B, which is at layer L+1. Node B is also the parent node of child node C and child node D in layer L+2. In the example shown in FIG. 2, the transmit offset index is a binary index and opposite values are assigned to a parent node and a child node. For instance, node A is assigned the transmit offset index value 0. Node B is assigned the transmit offset index value 1. Node C and node D are each assigned a transmit offset index 0.

The transmission priority of these nodes in a timeslot can be determined based on the transmit offset index and the ASN of the timeslot. In examples, the transmission priority is also a binary value, which can be either an early transmission priority or a late transmission priority. A node is determined to have the early transmission priority or the late transmission priority based on the transmit offset index and the parity of the ASN. For example, the following equation can be utilized to determine the transmission priority P of a node with transmit offset index Index in a timeslot ASN $$P=(ASN+Index) \bmod 2 \quad (1)$$

Here, mod is a modulo operator that finds the remainder after division of (ASN+Index) by 2. As such, the transmission priority P can take value 0 (early transmission priority) or 1 (late transmission priority). According to this equation, in an even-numbered ASN, nodes with index 0 (e.g., node A, node C, and node D) would have the early transmission priority and nodes with transmit offset index 1 (e.g., node B) would have a late transmission priority. In an odd-numbered ASN, nodes with transmit offset index 1 (e.g., node B) would have the early transmission priority and nodes with transmit offset index 0 (e.g., node A, node C, and node D) would have the late transmission priority. As such, for a pair of a parent node and a child node, their transmission priorities for a given timeslot are opposite to each other.

When a node has data to transmit in the current timeslot and has the early transmission priority, the node will start the normal transmission process to transmit data. As discussed above, the normal transmission process includes performing a CCA before transmitting the data packet. When the node has data to transmit but has a late transmission priority, the node will add an additional offset before transmitting the data packet. The additional offset is configured to be longer than the offset in the normal transmission process (including the time for performing the CCA). In some examples, the additional offset is a listen before talk (LBT) window, during which the node listens for incoming communications from nodes that have an early transmission priority. In some implementations, for a timeslot of 25 ms, the offset in the normal transmission process before the transmission is set to 5 ms, and the LBT window is set to 8 ms. Table 1 summarizes the transmission offsets for each node in FIG. 2 at different timeslots.

| Node | Layer | Slot/Time | | | | |
|---|---|---|---|---|---|---|
| | | 0 | 1 | 2 | 3 | 4 |
| A | L | CCA | LBT + CCA | CCA | LBT + CCA | CCA |
| B | L + 1 | LBT + CCA | CCA | LBT + CCA | CCA | LBT + CCA |
| C | L + 2 | CCA | LBT + CCA | CCA | LBT + CCA | CCA |
| D | L + 2 | CCA | LBT + CCA | CCA | LBT + CCA | CCA |

From Table 1, it can be seen that the priority of access to a slot is alternated for each new time slot. The fast alternating nature of the priority slot means that even under high levels of intra-network noise where the node frequently defers its transmission after the LBT window, any node wanting to access the channel only needs to wait at worst one slot before it does so. Thus, the LBT mode introduced herein only has a small impact on the transmission latency. Without the technology presented herein, a node wanting to access the channel may need to back-off as high as 50% of the time in dense noisy TSCH networks. As such, the technology presented herein achieves a good balance between an LBT-only and TSCH-only system.

Figure 3:
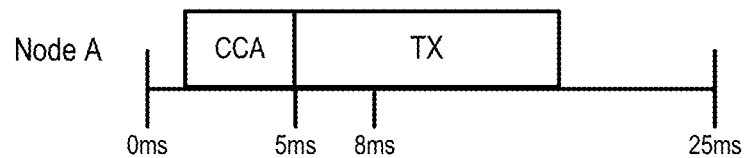
FIG. 3 is a diagram illustrating examples of the actions taken by a parent node and a child node to avoid collisions at different scenarios, according to certain examples of the disclosure.
Figure 3:
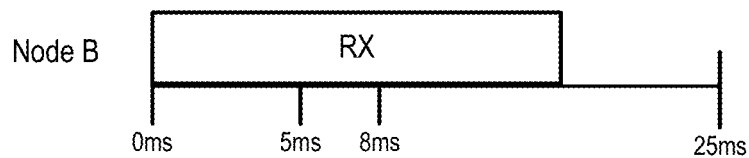
Figure 3:
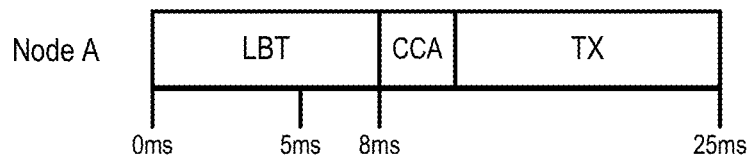
Figure 3:
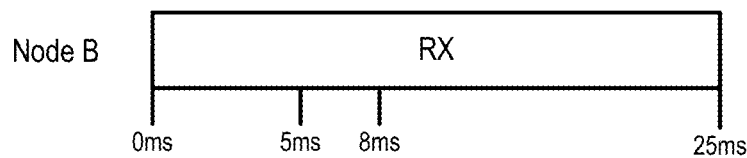
Figure 3:
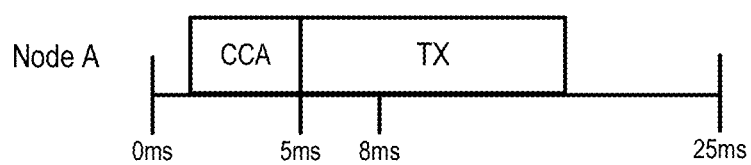
Figure 3:
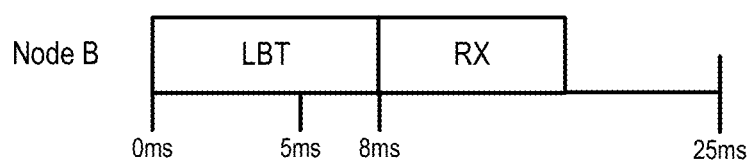
Figure 4:
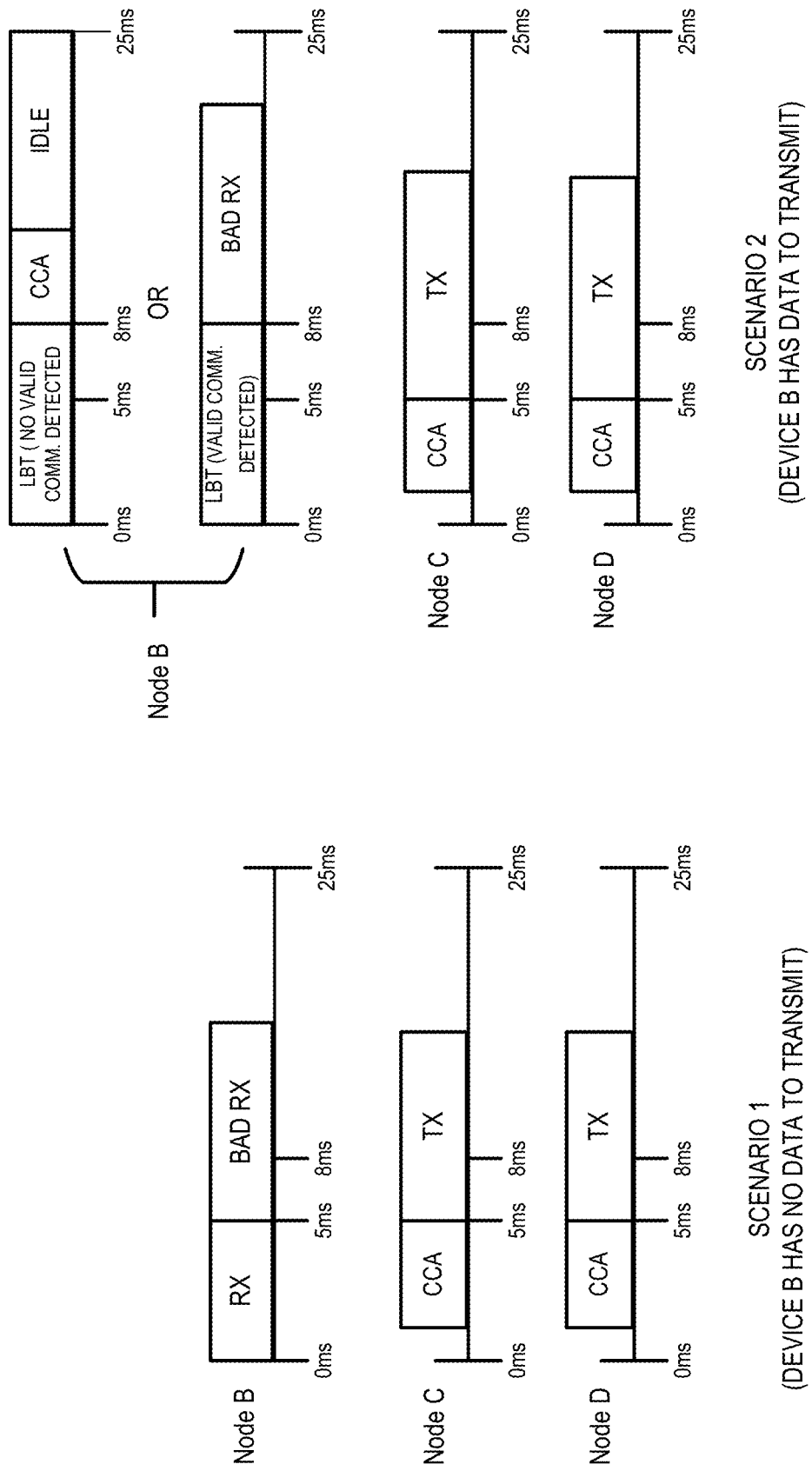
FIG. 4 is a diagram illustrating examples of actions taken by a parent node when collisions occur between its child nodes, according to certain examples of the disclosure.

FIGS. 3 and 4 show examples of the actions taken by the nodes in FIG. 2 to avoid collisions between a parent node and a child node at different scenarios, according to certain examples of the disclosure. In these examples, node A is the parent node of node B which is the parent node of nodes C and D as illustrated in FIG. 2. Nodes A, C, and D have the transmit offset index 0, and node B has the transmit offset index 1.

In scenario 1 of FIG. 3, the ASN of the current timeslot is 2 (even number). According to Eqn. (1), node A has the early transmission priority and node B has the late transmission priority. In this scenario, node A has data to transmit in the current timeslot, and node B does not. As such, at the beginning of the timeslot, node A can initiate the normal transmission process by starting with an offset of 5 ms. During this offset, node A can perform the CCA to detect whether there are ongoing communications on the network. If no ongoing communications are detected on the network, node A will start transmitting its data packets after the 5 ms offset is over. Node B will be in the receiving mode from the beginning of the timeslot since it does not have data to transmit. Node B will receive the transmission from node A.

In scenario 2 of FIG. 3, the ASN of the current timeslot is 3 (odd number). As such, node A has the late transmission priority and node B has the early transmission priority. In this scenario, node A has data to transmit and node B does not. At the beginning of the slot, node A enters the receiving mode for the duration of the LBT window to listen for incoming communications on the network. At the end of the LBT window, node A enters the transmission mode since it has data to transmit. Because node B does not transmit data, node A will detect no incoming communication in the LBT window and will begin the normal transmission process after the LBT window has passed. As discussed above, the normal transmission process involves performing the CCA and transmitting the data packets thereafter. Node B will receive the transmission from node A.

In scenario 3 of FIG. 3, the ASN of the current timeslot is 2 (even number). As such, node A has the early transmission priority and node B has the late transmission priority. In this scenario, both node A and node B have data to transmit. At the beginning of the slot, node B enters the LBT mode (i.e., enter the receiving model for the duration of the LBT window). Node A, on the other hand, starts the normal transmission process. After node A finishes the CCA and starts transmitting the data packet, node B will detect a valid incoming communication (such as a synchronization word) during the LBT window and defer its transmission. After the LBT window is over, node B will continue to receive the remaining transmission from node A for the rest of the timeslot. Node B will attempt to transmit its data packets in the next available slot. In this example, a collision is avoided.

As can be seen from FIG. 3, the technologies presented herein completely eliminate the collisions between the parent node and the child node (scenario 3) while having no impact (scenario 1) or little impact (the extra delay introduced in scenario 2) on the communications between the parent node and the child node.

FIG. 4 illustrates examples of the actions taken by a parent node when collisions occur between its child nodes. In scenario 1 of FIG. 4, the parent node B has the late transmission priority but does not have data to transmit in the current timeslot. As such, node B enters the receiving mode at the beginning of the timeslot. Since node C and node D both have data to transmit and have the early transmission priority, each of them performs the normal transmission process and starts to transmit data packets at the same time (i.e., after CCA is performed). Due to the collision, node B will receive corrupted data packets.

In scenario 2 of FIG. 4, the parent node B also has data to transmit, but still has the late transmission priority. In this scenario, node C and node D operate the same way as in scenario 1. The parent node B will enter the LBT mode to listen for incoming communication during the LBT window. If the parent node B does not detect valid data during the LBT (e.g., due to the collision between node C and node D), the parent node B will enter the normal transmission process. However, because of the collision between node C and node D, node B will detect ongoing communication during the CCA and will enter an idle state thereafter. In some cases, even though two nodes are both transmitting data at the same time, a receiving node may still detect valid communication, such as a synchronization word. As such, it is possible for the parent node B to detect valid communication during the LBT window when both nodes C and D are transmitting. If the parent node B is able to detect valid communication during the LBT window, node B will continue to be in the receiving mode after the LBT window. However, it will receive corrupted data packets due to the collision between node C and node B.

As can be seen from FIG. 4, although the technology presented herein cannot avoid the collisions between the two child nodes, it can prevent the parent node from transmitting data when the collision between child nodes occurs (scenario 2), thereby saving resources of the parent node, or have no impact on the communications between the parent node and the child node (scenario 1).

In some examples, a node can also decide whether to defter its transmission when incoming communications are received during the LBT window based on the signal strength of the received incoming communications. If the signal strength is below a signal strength threshold, the node can start its transmission after the LBT window is over even if incoming communications are received during the LBT window. If the signal strength is above the signal strength threshold, the node will defer its transmission to the next timeslot as discussed above. In this way, the node can avoid transmission delay due to the detection of communications from nodes with which the node is not concerned about the collision, such as its grandchild nodes, grandparent nodes, or other nodes that are located far from the node. The signal strength threshold can be determined based on the signal strength that the node typically detects from a concerned node that it tries to avoid collisions with, such as its parent node or its child node. For example, if the minimum signal strength from the concerned node (e.g., a parent node or a child node) was relatively strong (such as −80 dBm), the signal strength threshold can be set to −90 dBm. This would result in the node only backs off for its concerned node (e.g., parent/children node), but not any other node that might be located far away, but within reception signal strength (typically −110 dBm).

Figure 5:
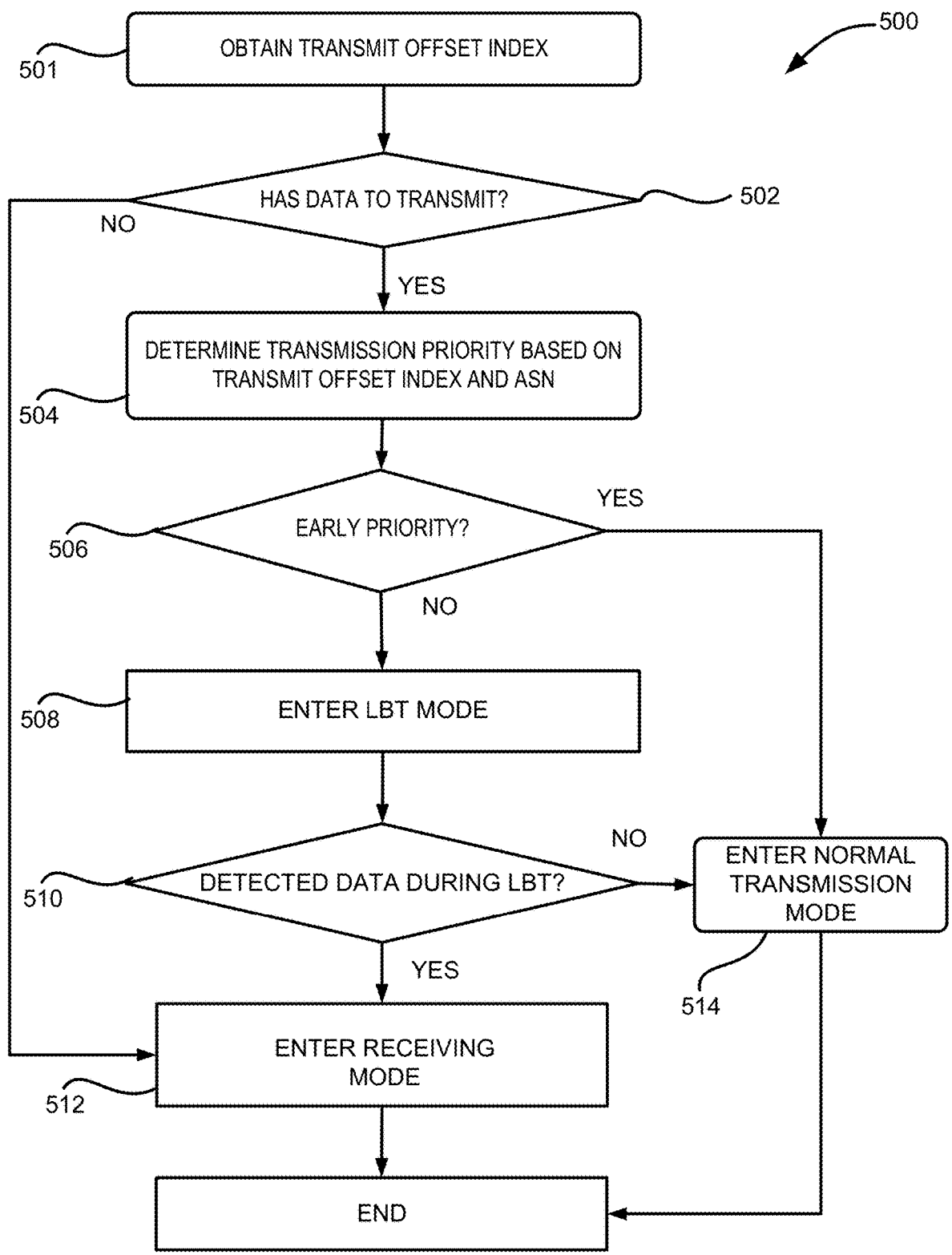
FIG. 5 is an example of a process for avoiding collision in a mesh network, according to certain examples of the disclosure.

Referring now to FIG. 5, FIG. 5 is an example of a process 500 for avoiding collision between a parent node and a child in a mesh network, according to certain examples of the disclosure. One or more nodes of the network 102 (e.g., the node 112 or the root node 114) implement operations depicted in FIG. 5 by executing suitable program code. The process 500 can be performed for each timeslot. For illustrative purposes, the process 500 is described with reference to certain examples depicted in the figures. Other implementations, however, are possible.

At block 501, the process 500 involves obtaining the transmit offset index for the node. For example, the transmit offset index may be assigned by the parent node of the node when the node joins the network through the parent or switches to the current parent node. As discussed above in detail with respect to FIGS. 1 and 2, the transmit offset index is assigned to the node such as it is different from the transmit offset index of its parent node. In this way, the parent node and the child node can have different transmission priorities. The node can store the transmit offset index in a memory device and retrieve the transmit offset index from the memory device when needed.

At block 502, the process 500 involves determining whether the node has data to transmit in the current timeslot. If the node does not have data to transmit, the process 500 involves entering a receiving mode at block 512. If the node has data to transmit in the current timeslot, process 500 involves determining, at block 504, the transmission priority of the node based on the transmit offset index and the ASN of the current timeslot. As discussed above in detail with regard to FIG. 2, the node can determine an early transmission priority or a late transmission priority based on the transmit offset index and the parity of the ASN. For example, according to Eqn. (1), in even-numbered ASN, nodes with transmit offset index 0 would have the early transmission priority, and nodes with transmit offset index 1 would have a late transmission priority. The transmission priority can be determined in other ways as long as the transmission priorities of the parent node and the child node are different. For instance, the transmission priority can be determined such that in even-numbered ASNs, nodes with index 1 would have the early transmission priority and nodes with transmit offset index 0 would have a late transmission priority, and in odd-numbered ASN, nodes with index 1 would have the late transmission priority and nodes with transmit offset index 0 would have the early transmission priority.

At block 506, the process 500 involves determining whether the node has the early transmission priority. If so, the node enters the normal transmission mode at block 514. Otherwise, the node enters the LBT mode at block 508. In the LBT mode, the node starts an LBT window and enters the receiving mode to listen for incoming communications on the network. As discussed in detail above with respect to FIGS. 2-4, the LBT window can be configured to be longer than the offset in the normal transmission process. In this way, when a node with the early transmission priority completes the CCA and starts transmitting data packets, the node with the late transmission priority is still in the receiving mode (i.e., the LBT mode) and can receive incoming communications.

At block 510, the process 500 involves determining whether the node has detected data during the LBT window. If so, the node enters the receiving mode at block 512, where the node continues to listen for incoming communication on the network. If the node detects no incoming communication during the LBT window, the node enters the normal transmission mode at block 514 and will attempt to transmit its data packets in the next timeslot. In the normal transmission mode, the node starts an offset time period during which it performs CCA for ongoing communications on the network. If the node does not detect ongoing communication, the node starts to transmit its data packet. If the node detects ongoing communication during the CCA, the node will stay idle for the rest of the timeslot.

It should be understood that the operations described above with respect to FIG. 5 are for illustration purposes and should not be construed as limiting. Fewer or more operations may be involved in the process 500 and the operations in process 500 may be carried out in different orders. For example, block 504 may be carried out before block 502 and as a result, the transmission priority is always determined for the timeslot regardless of whether the node has data to transmit or not. Various other ways to implement the mechanism presented herein for avoiding collision between a parent node and a child node can be used.

Exemplary Node

Figure 6:
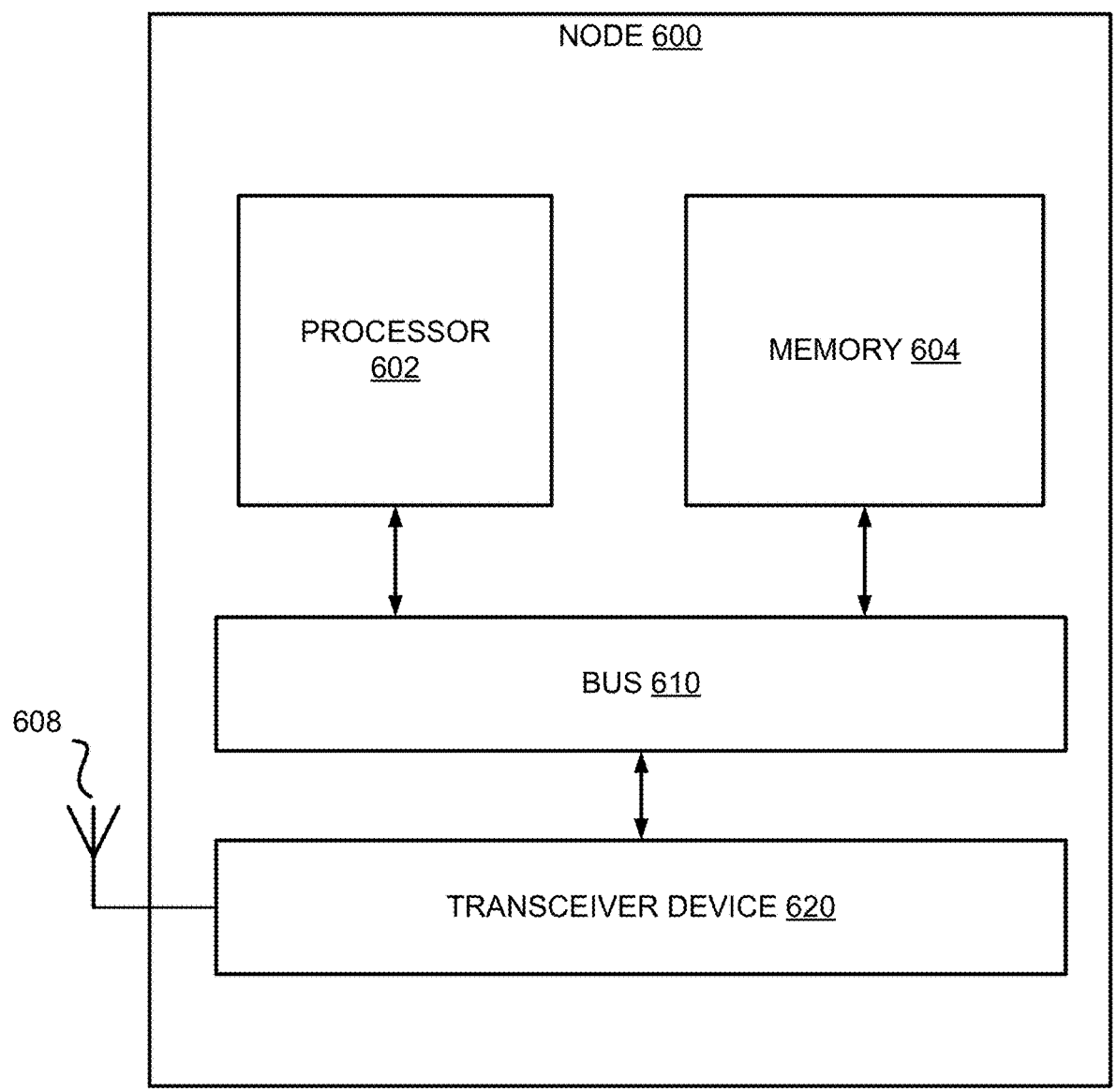
FIG. 6 is a block diagram depicting an example of a computing system suitable for implementing aspects of the techniques and technologies presented herein.

FIG. 6 illustrates an exemplary node 600 that can be employed to implement the collision avoidance described herein, such as a node 112 or a root node 114. The node 600 may include a processor 602, memory 604, and a transceiver device 620 each communicatively coupled via a bus 610. The components of node 600 can be powered by an A/C power supply or a low energy source, such as a battery (not shown). The transceiver device 620 can include (or be communicatively coupled to) an antenna 608 for communicating with other nodes. In some examples, the transceiver device is a radio-frequency ("RF") transceiver for wirelessly transmitting and receiving signals.

The processor may include a microprocessor, an application-specific integrated circuit ("ASIC"), a state machine, a field programmable gate array ("FPGA") or other suitable computing device. The processor can include any number of computing devices and can be communicatively coupled to a computer-readable media, such as memory 604. The processor 602 can execute computer-executable program instructions or access information stored in memory to perform operations. The instructions may comprise processor-specific instructions generated by a compiler and/or an interpreter from code written in any suitable computer-programming language. When instructions are executed, they may configure the node 600 to perform any of the operations described herein. Although the processor, memory, bus, and transceiver device are depicted in FIG. 6 as separate components in communication with one another, other implementations are possible. The systems and components discussed herein are not limited to any particular hardware architecture or configuration.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for reducing collision in a time-slotted channel hopping (TSCH) network, the method comprising:
obtaining, by a node in the TSCH network, a transmit offset index;
determining, by the node at a beginning of a timeslot of the TSCH network, a transmission priority of the node for the timeslot based on the transmit offset index and an absolute slot number (ASN) of the timeslot, wherein the transmission priority indicates an order of the node transmitting data compared with at least another node in the TSCH network and is determined independently of whether the node has data to transmit;
in response to determining that the transmission priority of the node is an early transmission priority, transmitting data, by the node, in a transmission mode via the TSCH network; and
in response to determining that the transmission priority of the node is a late transmission priority,
listening for, by the node, incoming communications on the TSCH network in a listen before talk (LBT) mode; and
in response to detecting no incoming communications during the LBT mode, transmitting data, by the node after the LBT mode is over, in the transmission mode via the TSCH network.

2. The method of claim 1, further comprising:
in response to detecting an incoming communication during the LBT mode, continuing to receive the incoming communication on the TSCH network.

3. The method of claim 1, further comprising:
determining that the node has no data to transmit; and
entering a receiving mode at the beginning of the timeslot.

4. The method of claim 1, wherein the transmit offset index is a binary value, and wherein the transmission priority of the node for the timeslot is a binary value determined based on the transmit offset index and parity of the ASN.

5. The method of claim 1, wherein transmitting data in the transmission mode comprises:
performing a clear channel assessment (CCA) to detect ongoing transmission on the TSCH network; and
responsive to determining that no ongoing transmission is detected on the TSCH network, transmitting packets of the data via the TSCH network.

6. The method of claim 5, wherein the LBT mode has a predetermined duration and wherein determining whether an incoming communication is detected during the LBT mode comprises determining whether an incoming communication is detected during the predetermined duration of the LBT mode.

7. The method of claim 6, wherein the CCA is performed during a predetermined offset of the transmission mode, and wherein the predetermined offset is shorter than the predetermined duration of the LBT mode.

8. The method of claim 1, wherein obtaining the transmit offset index comprises receiving an assignment of the transmit offset index from another node in the TSCH network.

9. A node of a time-slotted channel hopping (TSCH) network, comprising:
a processor configured to execute computer-readable instructions;
a memory configured to store the computer-readable instructions that, when executed by the processor, cause the processor to perform operations comprising:
determining, at a beginning of a timeslot of the TSCH network, a transmission priority of the node for the timeslot based on a transmit offset index assigned to the node and an absolute slot number (ASN) of the timeslot, wherein the transmission priority indicates an order of the node transmitting data compared with at least another node in the TSCH network and is determined independently of whether the node has data to transmit;

in response to determining that the transmission priority of the node is an early transmission priority, transmitting data in a transmission mode via the TSCH network; and in response to determining that the transmission priority of the node is a late transmission priority, listening for incoming communications on the TSCH network in a listen before talk (LBT) mode; and in response to detecting no incoming communications during the LBT mode, transmitting, after the LBT mode is over, data in the transmission mode via the TSCH network.

10. The node of claim 9, wherein the operations further comprise:

in response to detecting an incoming communication during the LBT mode, continuing to receive the incoming communication on the TSCH network.

11. The node of claim 9, wherein the operations further comprise:

determining that the node has no data to transmit; and
entering a receiving mode at the beginning of the timeslot.

12. The node of claim 9, wherein the transmit offset index is a binary value, and wherein the transmission priority of the node is a binary value determined based on the transmit offset index and parity of the ASN.

13. The node of claim 9, wherein transmitting data in the transmission mode comprises:

performing a clear channel assessment (CCA) to detect ongoing transmission on the TSCH network; and responsive to determining that no ongoing transmission on the TSCH network, transmitting packets of the data via the TSCH network.

14. The node of claim 9, wherein obtaining the transmit offset index comprises receiving an assignment of the transmit offset index from another node in the TSCH network.

15. A system, comprising:

a plurality of nodes connected through a time-slotted channel hopping (TSCH) network, wherein a first node of the plurality of nodes is configured for performing operations comprising:

determining, at a beginning of a timeslot of the TSCH network, a transmission priority of the first node for the timeslot based on a transmit offset index assigned to the first node and an absolute slot number (ASN) of the timeslot, wherein the transmission priority indicates an order of the node transmitting data compared with at least another node in the TSCH network and is determined independently of whether the node has data to transmit;

in response to determining that the transmission priority of the first node is an early transmission priority, transmitting data in a transmission mode via the TSCH network to a second node of the plurality of nodes; and in response to determining that the transmission priority of the node is a late transmission priority, listening for incoming communications from the second node on the TSCH network in a listen before talk (LBT) mode; and in response to detecting no incoming communications from the second node during the LBT mode, transmitting data in the transmission mode to the second node via the TSCH network after the LBT mode is over.

16. The system of claim 15, wherein the operations further comprise:

in response to detecting an incoming communication from the second node during the LBT mode, continuing to receive the incoming communication from the second node on the TSCH network.

17. The system of claim 15, wherein the operations further comprise:

determining that the first node has no data to transmit; and
entering a receiving first mode at the beginning of the timeslot.

18. The system of claim 15, wherein the transmit offset index is a binary value, and wherein the transmission priority of the first node is a binary value determined based on the transmit offset index and parity of the ASN.

19. The system of claim 15, wherein the first node and the second node have a parent-child relationship, and wherein the transmission priority of the first node for the timeslot is opposite to a transmission priority of the second node for the timeslot.

20. The system of claim 15, wherein:

the LBT mode has a predetermined duration;
the transmission mode has a predetermined offset during which a clear channel assessment (CCA) is performed to detect ongoing transmission on the TSCH network; and
the predetermined offset is shorter than the predetermined duration of the LBT mode.

* * * * *